United States Patent
Kobayashi

(10) Patent No.: US 10,641,656 B1
(45) Date of Patent: May 5, 2020

(54) SPECTROMETER AND INCIDENT LIGHT LIMITING MEMBER TO BE USED FOR THE SAME

(71) Applicant: SHIMADZU CORPORATION, Kyoto-shi, Kyoto (JP)

(72) Inventor: Tomoari Kobayashi, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/226,860

(22) Filed: Dec. 20, 2018

(51) Int. Cl.
  *G01J 3/28* (2006.01)
  *G01J 3/02* (2006.01)
  *G01J 3/18* (2006.01)
  *G01J 3/04* (2006.01)

(52) U.S. Cl.
  CPC .............. *G01J 3/0262* (2013.01); *G01J 3/024* (2013.01); *G01J 3/0229* (2013.01); *G01J 3/04* (2013.01); *G01J 3/18* (2013.01)

(58) Field of Classification Search
  CPC ........ G01J 3/0262; G01J 3/0229; G01J 3/024; G01J 3/04; G01J 3/18
  USPC ....................................................... 356/328
  See application file for complete search history.

(56) References Cited

U.S. PATENT DOCUMENTS

| | | | | |
|---|---|---|---|---|
| 4,563,585 A | * | 1/1986 | Ward | G01J 3/457 250/373 |
| 5,123,740 A | * | 6/1992 | Giebeler, Jr. | G01J 3/02 356/331 |
| 6,181,418 B1 | * | 1/2001 | Palumbo | G01J 3/02 356/305 |
| 2003/0048442 A1 | * | 3/2003 | Xiao | G01J 3/04 356/328 |

FOREIGN PATENT DOCUMENTS

| | | |
|---|---|---|
| JP | 6102093 A | 4/1994 |
| JP | 2008-185525 A | 8/2008 |
| JP | 2017-223494 A | 12/2017 |

OTHER PUBLICATIONS

Communication dated Aug. 20, 2019, from the Japanese Patent Office in application No. 2016-117900.

* cited by examiner

*Primary Examiner* — Tarifur R Chowdhury
*Assistant Examiner* — Jonathon Cook
(74) *Attorney, Agent, or Firm* — Sughrue Mion, PLLC

(57) ABSTRACT

Provided are a spectrometer capable of more effectively reducing stray light and an incident light limiting member to be used for the spectrometer. At least a part of light not entering an effective area of a diffraction grating is blocked by being reflected by a mask plate provided between an incidence plate and the diffraction grating. Further, the light reflected by the mask plate is attenuated in a trap space. Thus, the light blocked by the mask plate does not reach the diffraction grating side and does not function as a stray light source, so that stray light can be more effectively reduced.

7 Claims, 9 Drawing Sheets

SPECTROMETER AND INCIDENT LIGHT LIMITING MEMBER TO BE USED FOR THE SAME

CROSS REFERENCE TO RELATED APPLICATION

This application relates to, but does not claim priority from, JP Ser. No.:JP2016-117900 filed on Jun. 14, 2016 and published as JP Pub. No.:JP2017-223494 on Dec. 21, 2017, the entire contents of which are incorporated herein fully by reference.

BACKGROUND OF THE INVENTION

Field of the Invention

The present invention relates to a spectrometer that diffracts light having passed through an incidence slit with a diffraction grating and thus disperses the light, and relates to an incident light limiting member to be used for the spectrometer.

Description of the Related Art

As an example of a spectrometer, there is known a monochromator that diffracts light incident from an incidence slit with a diffraction grating and emits only light of a specific wavelength from an emission slit (see, for example, JP-A-2008-185525). In this type of spectrometer, a diffraction grating is provided, for example, in a housing, and on the wall surface of the housing there are provided an incidence part (incidence port) having an incidence slit formed therein and an exit part (exit port) having an emission slit formed therein.

Light from a light source is converged via an optical system and enters the housing through the incidence slit having a minute opening. The light having entered the housing reaches the diffraction grating while spreading, and is dispersed into light of different wavelengths by diffraction in the effective area (grating surface) of the diffraction grating. The diffraction grating is rotatably provided, and light of a specific wavelength corresponding to the rotational position is condensed and emitted to the outside of the housing through the emission slit.

In a highly versatile monochromator, the configuration of the optical system for guiding light from the light source is arbitrarily selected by a user. As the above optical system, there are various variations such as a configuration in which a condenser lens is used to condense the light from the light source and a configuration in which one or more optical fibers are used to guide the light from the light source.

SUMMARY OF THE INVENTION

When the optical system that guides the light from the light source has various variations as described above, the brightness of an incident light flux changes depending on the configuration of the optical system. That is, when an angular range of the incident light flux is large, an F value which is an index of the brightness is small, and the brightness of the incident light flux is large. To the contrary, when the angular range of the incident light flux is small, the F value is large, and the brightness of the incident light flux is small.

FIGS. 8A and 8B are schematic cross-sectional views for describing an angular range θ2 of the incident light flux. The light from the light source enters a housing 102 through an incidence slit 101 and is diffracted in an effective area 131 of a diffraction grating 103 provided in the housing 102.

When the F value is small and the angular range θ2 of the incident light flux is large as shown in FIG. 8A, light enters the entire effective area 131 of the diffraction grating 103 in some cases. To the contrary, as shown in FIG. 8B, when the F value is large and the angular range θ2 of the incident light flux is small, light may be incident only on a part of the effective area 131 of the diffraction grating 103.

If the F value is small, the sensitivity is improved, while if the F value is large, the resolution is improved. Therefore, the user can arbitrarily set the angular range θ2 of the incident light flux, depending on the desired sensitivity or resolution, by adjusting the optical system (such as a condenser lens) that guides the light from the light source to the incidence slit 101.

However, the above adjustment of the optical system is not easy, and in addition, as shown in FIG. 8A, there is a case where light enters beyond the effective area 131 of the diffraction grating 103. In FIG. 8A, the light not entering the effective area 131 of the diffraction grating 103 is indicated by hatching. In this case, the light not entering the effective area 131 functions as a stray light source, which may adversely affect the measurement result.

Further, it is troublesome to perform the operation of setting the angular range θ2 of the incident light flux each time the configuration of the optical system is changed; therefore, some users use a monochromator instead of performing such setting work. Also in such case, as shown in FIG. 8A, light may be incident beyond the effective area 131 of the diffraction grating 103.

As described above, there is a problem that stray light is easily generated in a highly versatile monochromator. In order to solve such a problem, for example, countermeasures have been taken to reduce stray light by painting the inner surface of the housing in black or by attaching a member having a low reflectance to the inner surface of the housing. There is also known a method for preventing scattering of light at an edge part of the diffraction grating by providing a black mask part on the edge part to reduce the stray light.

However, the conventional method for reducing stray light as described above does not prevent the light beyond the effective area 131 of the diffraction grating 103 from entering the housing. That is, the above method does not completely block the stray light source, and it is impossible to completely prevent stray light from being generated in the housing, so that a configuration capable of more effectively reducing stray light has been desired.

The present invention has been made in view of the above circumstances, and an object of the present invention is to provide a spectrometer capable of more effectively reducing stray light and an incident light limiting member to be used for the spectrometer.

A spectrometer according to the present invention includes an incidence part, a diffraction grating, a mask part, and a trap part. In the incidence part, there is formed an incidence slit through which light from a light source passes. The diffraction grating disperses the light having passed through the incidence slit by diffracting the light in an effective area. The mask part is provided between the incidence part and the diffraction grating and blocks, by reflection, at least a part of the light that has passed through the incidence slit but does not enter the effective area. The trap part has a trap space formed to attenuate the light reflected by the mask part.

With such a configuration, at least the part of the light not entering the effective area of the diffraction grating is blocked by being reflected by the mask part provided between the incidence part and the diffraction grating. Further, the light reflected by the mask part is attenuated in the trap space. As a result, the light blocked by the mask part does not reach the diffraction grating side and does not function as a stray light source, so that stray light can be more effectively reduced.

The diffraction grating may be held rotatably around a rotation axis. In this case, it is preferable that the mask part block, by reflection, light that does not enter the effective area in a state where the diffraction grating is rotated at a rotational position where the amount of light entering at least the effective area is largest.

With such a configuration, light which does not enter the effective area even in a state where the diffraction grating is rotated at any rotational position is blocked by being reflected by the mask part. As a result, unnecessary light can be surely blocked, so that stray light can be more effectively reduced.

The mask part may be detachably attached to the trap part.

With such a configuration, since the mask part can be attached to the trap part as needed, it is possible to provide a spectrometer having the configuration of the present invention only for users who need the mask part. Further, for example, in the case of the configuration in which the incidence part is provided in the trap part, the positional relationship among the incidence part, the trap part, and the mask part does not deviate, so that it is possible to precisely block the stray light source and to reduce work and time to adjust positions.

The mask part and the trap part may be integrally formed.

With such a configuration, since the positional relationship between the mask part and the trap part does not deviate, the stray light source can be precisely blocked. Further, for example, in the case of the configuration in which the incidence part is provided in the trap part, the positional relationship between the trap part and the incidence part does not deviate, so that it is possible to block the stray light source more precisely and to reduce work and time to adjust positions.

The mask part may be provided with a low-reflectance member for reflecting light while attenuating the light.

With such a configuration, when at least a part of the light not entering the effective area of the diffraction grating is reflected by the mask part provided between the incidence part and the diffraction grating, the part of the light is reflected while being attenuated by the low-reflectance member provided in the mask part, and in addition, the reflected light is attenuated in the trap space. Therefore, stray light can be more effectively reduced.

A low-reflectance member may be provided on an inner surface of the trap space to reflect the light while attenuating the light.

With such a configuration, at least a part of the light that does not enter the effective area of the diffraction grating is reflected by the mask part provided between the incidence part and the diffraction grating, and then, the reflected light is reflected while being attenuated by the low-reflectance member provided on the inner surface of the trap space. Therefore, stray light can be more effectively reduced.

An incident light limiting member according to the present invention is an incident light limiting member that limits light from a light source entering a spectrometer having a diffraction grating and that includes an incidence part, a mask part, and a trap part. The incidence slit through which light from the light source passes is formed in the incidence part. The mask part is provided between the incidence part and the diffraction grating and blocks, by reflection, at least a part of the light that has passed through the incidence slit but does not enter the effective area of the diffraction grating. The trap part has a trap space formed to attenuate the light reflected by the mask part.

In the present invention, the light blocked by the mask part does not reach the diffraction grating side and does not function as a stray light source, so that stray light can be more effectively reduced.

DETAILED DESCRIPTION OF THE PREFERRED EMBODIMENTS

Figure 1:
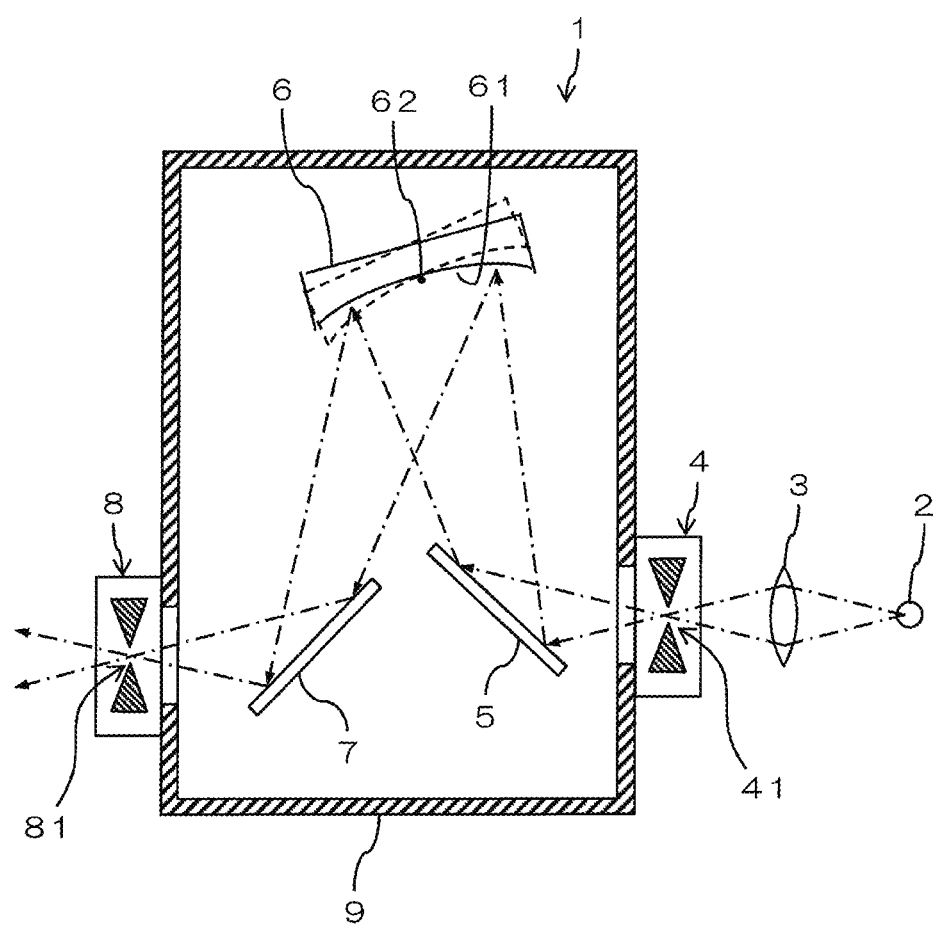
FIG. 1 is a schematic cross-sectional view showing a configuration example of a spectrometer according to an embodiment of the present invention.

FIG. 1 is a schematic cross-sectional view showing a configuration example of a spectrometer 1 according to an embodiment of the present invention. The spectrometer 1 is a monochromator for dispersing light from a light source 2, and the light from the light source 2 is condensed by a condenser lens 3 and enters the spectrometer 1. The condenser lens 3 constitutes an optical system for guiding the light from the light source 2 to the spectrometer 1, and a user can arbitrarily select the configuration of the optical system. That is, the spectrometer 1 according to the present embodiment is highly versatile, and it is possible to change the type of the condenser lens 3 or to employ an optical system other than the condenser lens 3.

The spectrometer 1 includes, for example, an incident light limiting member 4, a first reflection mirror 5, a diffraction grating 6, a second reflection mirror 7, an outgoing light limiting member 8, and other components. The outer shape of the spectrometer 1 is defined by a housing 9. The first reflection mirror 5, the diffraction grating 6, and the second reflection mirror 7 are provided in the housing 9, and an incident light limiting member 4 and the outgoing light limiting member 8 are attached to a wall surface of the housing 9. The incident light limiting member 4 and the outgoing light limiting member 8 are preferably detachable from the wall surface of the housing 9.

The incident light limiting member 4 is provided with an incidence slit 41 constituted by, for example, a small hole, and only light having passed through the incidence slit 41 is directed to the housing 9. With this arrangement, it is possible to limit the light, from the light source 2, incident on the spectrometer 1 and to reflect only the light having entered the spectrometer 1 by the first reflection mirror 5, thereby guiding the light to the diffraction grating 6.

The light having passed through the incidence slit 41 reaches the diffraction grating 6 while spreading. However, the first reflection mirror 5 may be configured with, for example, a collimation mirror so that the light having passed through the incidence slit 41 is formed into parallel light by the first reflection mirror 5 and is then guided to the diffraction grating 6. In addition, the first reflection mirror 5 may be omitted, and the light having passed through the incidence slit 41 may be directly guided to the diffraction grating 6.

In the diffraction grating 6, a grating surface constituted by a concave surface is formed, and the grating surface constitutes an effective area 61 that the light having passed through the incidence slit 41 enters. The light having passed through the incidence slit 41 is dispersed into light of different wavelengths by being diffracted in the effective area 61. Then, the dispersed light of a specific wavelength is reflected by the second reflection mirror 7 and exits to the outside of the housing 9 via the outgoing light limiting member 8. The second reflection mirror 7 is constituted by, for example, a converging mirror, and condenses the light from the diffraction grating 6 and guides the light to the outgoing light limiting member 8.

The diffraction grating 6 is rotatably held around a rotation axis 62. For example, as indicated by the broken line in FIG. 1, by rotating the diffraction grating 6 around the rotation axis 62, the light of a specific wavelength corresponding to the rotational position is condensed and is emitted to the outside of the housing 9 via the outgoing light limiting member 8.

The outgoing light limiting member 8 is provided with an emission slit 81 constituted by, for example, a small hole, and only the light having passed through the emission slit 81 is emitted to the outside of the housing 9. Thereby, it is possible to limit the emission of stray light generated in the spectrometer 1 and to allow only the light of a specific wavelength dispersed by the diffraction grating 6 to be emitted from the emission slit 81.

Figure 2:
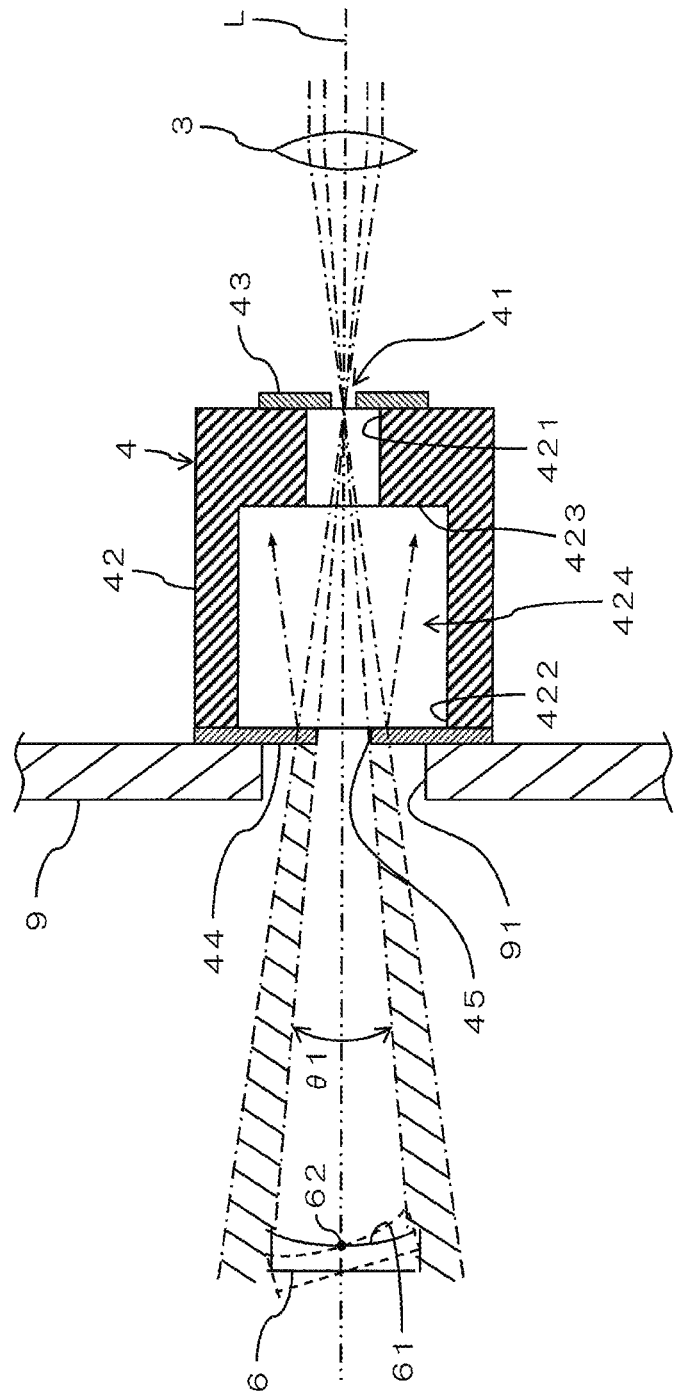
FIG. 2 is a schematic cross-sectional view showing a configuration example of an incident light limiting member.

FIG. 2 is a schematic cross-sectional view showing a configuration example of the incident light limiting member 4. In FIG. 2, the first reflection mirror 5 is omitted for simpler description. The incident light limiting member 4 includes, for example, a main body 42, an incidence plate 43, and a mask plate 44. The incident light limiting member 4 is attached to, for example, a wall surface of the housing 9 from the outside.

The main body 42 is constituted by, for example, a cylindrical member and has an entrance-side opening 421 formed at one end part and an exit-side opening 422 at the other end part. The light entering the incident light limiting member 4 from the light source 2 via the condensing lens 3 enters from the entrance-side opening 421 along the axial line L of the main body 42 and passes through the inside of the main body 42 and exits from the exit-side opening 422.

The exit-side opening 422 has a larger diameter than the entrance-side opening 421 and communicates with the entrance-side opening 421 via a step surface 423. The step surface 423 is constituted by, for example, a surface orthogonal to an incidence direction of light (direction of the axial line L). However, configurations other than the above configuration may be used, and the step surface 423 may be constituted by a surface, like a conical surface, extending in the direction intersecting the direction of the axial line L.

The incidence plate 43 constitutes an incidence part in which the incidence slit 41 is formed. The incidence plate 43 is attached to one end face of the main body 42 so as to cover a part of the entrance-side opening 421. That is, the incidence plate 43 hangs over a position facing a part of the entrance-side opening 421, and the light having passed through the incidence slit 41 enters the main body 42 via the entrance-side opening 421.

The incidence plate 43 is detachable from the main body 42. In the case where the incidence plate 43 is detachable from the main body 42 as described above, the configuration in which the incidence plate 43 can be attached, being positioned by a positioning member (not shown) such as a pin provided on the main body 42 is preferable. However, the incidence plate 43 does not have to be detachable from the main body 42, and may be fixed to the main body 42.

The mask plate 44 constitutes a mask part in which the emission slit 45 is formed. The emission slit 45 is constituted by an opening larger than the incidence slit 41. The mask plate 44 covers a part of the exit-side opening 422 by being attached to the other end face of the main body 42. That is, the mask plate 44 hangs over a position facing a part of the exit-side opening 422, and only light having passed through the emission slit 45 enters the housing 9.

In the housing 9, an opening 91 larger than the emission slit 45 is formed, and the incident light limiting member 4 is attached to the housing 9 such that the emission slit 45 faces the opening 91. The incident light limiting member 4 may be fixed to the housing 9 or detachable. In the case where the incident light limiting member 4 is detachable from the housing 9, the configuration in which the incident light limiting member 4 can be attached, being positioned by a positioning member such as a pin provided on the incident light limiting member 4 or the housing 9 is preferable.

The mask plate 44 is provided between the incidence plate 43 and the diffraction grating 6 and can limit the light guided from the incidence slit 41 to the side of the diffraction grating 6, depending on the shape and position of the emission slit 45. In the present embodiment, the shape and position of the emission slit 45 are set such that the mask plate 44 blocks at least a part of the light that has passed through the incidence slit 41 but does not enter the effective area 61 of the diffraction grating 6.

More specifically, as indicated by hatching in FIG. 2, the shapes and positions of the incidence slit 41, the emission slit 45, and the effective area 61 are set such that the mask plate 44 blocks whole or a part of light in a range exceeding the angular range θ1 of the incident light flux entering the effective area 61 of the diffraction grating 6. The light blocked by the mask plate 44 is reflected by the mask plate 44 and thus remains in the main body 42.

The mask plate 44 is detachable from the main body 42. In the case where the mask plate 44 is detachable from the main body 42 as described above, the configuration is preferable such that the mask plate 44 can be attached, being positioned by a positioning member (not shown) such as a pin provided on the main body 42. However, the mask plate 44 does not have to be detachable from the main body 42, and may be fixed to the main body 42.

In the main body 42, a trap space 424 that attenuates the light reflected by the mask plate 44 is formed. The trap space 424 is, for example, a space between the exit-side opening 422 and the step surface 423, and the light reflected by the mask plate 44 is attenuated by being repeatedly reflected in the trap space 424 (by the inner surface of the main body 42 or the step surface 423). The main body 42 constitutes a trap part in which the trap space 424 is formed.

The reflective surfaces such as the inner surface of the trap space 424, that is, the inner surface of the main body 42 and the surface, on the side of the trap space 424 of the mask plate 44 are painted black, for example, so that light can be attenuated. However, the configuration for attenuating light is not limited to the configuration in which the reflective surface is painted black, and other configurations may be employed, for example, a configuration in which the reflective surface is painted in other colors and a configuration in which a low-reflectance member is attached on the reflective surface.

As described above, in the present embodiment, at least a part of the light not entering the effective area 61 of the diffraction grating 6 is blocked by being reflected by the mask plate 44 provided between the incidence plate 43 and the diffraction grating 6. Further, the light reflected by the mask plate 44 is attenuated in the trap space 424. Thus, the light blocked by the mask plate 44 does not reach the side of the diffraction grating 6 and does not function as a stray light source, so that stray light can be more effectively reduced.

Further, in the present embodiment, since the mask plate 44 is detachable from the main body 42, the spectrometer 1 including the configuration of the present embodiment can be provided only to users who need such a configuration by attaching the mask plate 44 to the main body 42 as necessary. Further, in the case of the configuration in which the incidence plate 43 is attached to the main body 42 as in the present embodiment, the positional relationship among the incidence plate 43, main body 42, and mask plate 44 does not deviate, so that it is possible to precisely block the stray light source and to reduce work and time to adjust positions.

As described above, the diffraction grating 6 is rotatable around the rotation axis 62. Therefore, for example, since the angle of the effective area 61 with respect to the light from the emission slit 45 is different between, for example, the case where the diffraction grating 6 is at the rotational position indicated by the solid line in FIG. 2 and the case where the diffraction grating 6 is in the rotational position indicated by the broken line in FIG. 2, the amount of the light entering the effective area 61 is different between the two cases.

In the present embodiment, setting is made such that mask plate 44 blocks, by reflection, the light that does not enter the effective area 61 at least in a state where the diffraction grating 6 is at the rotational position indicated by the solid line in FIG. 2, in other words, the light in a range (the light indicated by hatching in FIG. 2) exceeding the angular range θ1 of the incident light flux entering the effective area 61 of the diffraction grating 6. In a state where the diffraction grating 6 is at the rotational position indicated by the solid line in FIG. 2, the amount of the light entering the effective area 61 is largest, compared with other rotational positions as indicated by the broken line in FIG. 2.

With such setting, the light that does not enter the effective area 61 (the light indicated by hatching in FIG. 2) even in a state where the diffraction grating 6 is rotated at any rotational position is blocked by being reflected by the mask plate 44. As a result, unnecessary light can be surely blocked, so that stray light can be more effectively reduced.

However, the mask plate 44 is not limited to such a configuration that blocks only the light in a range exceeding the angular range θ1 of the incident light flux entering the effective area 61 of the diffraction grating 6. That is, the mask plate 44 may be configured to block the light from the incidence slit 41 in a range narrower than the angular range θ1, or may be configured to block the light from the incidence slit 41 in a range wider than the above angular range θ1.

In the above embodiment, the description is given to the configuration in which the incident light limiting member 4 is attached to the wall surface of the housing 9 from outside. However, the present invention is not limited to this configuration and the incident light limiting member 4 may be attached to the wall surface of the housing 9 from inside. Further, at least one of the main body 42, the incidence plate 43 and the mask plate 44 may be provided separately from each other.

Figure 3:
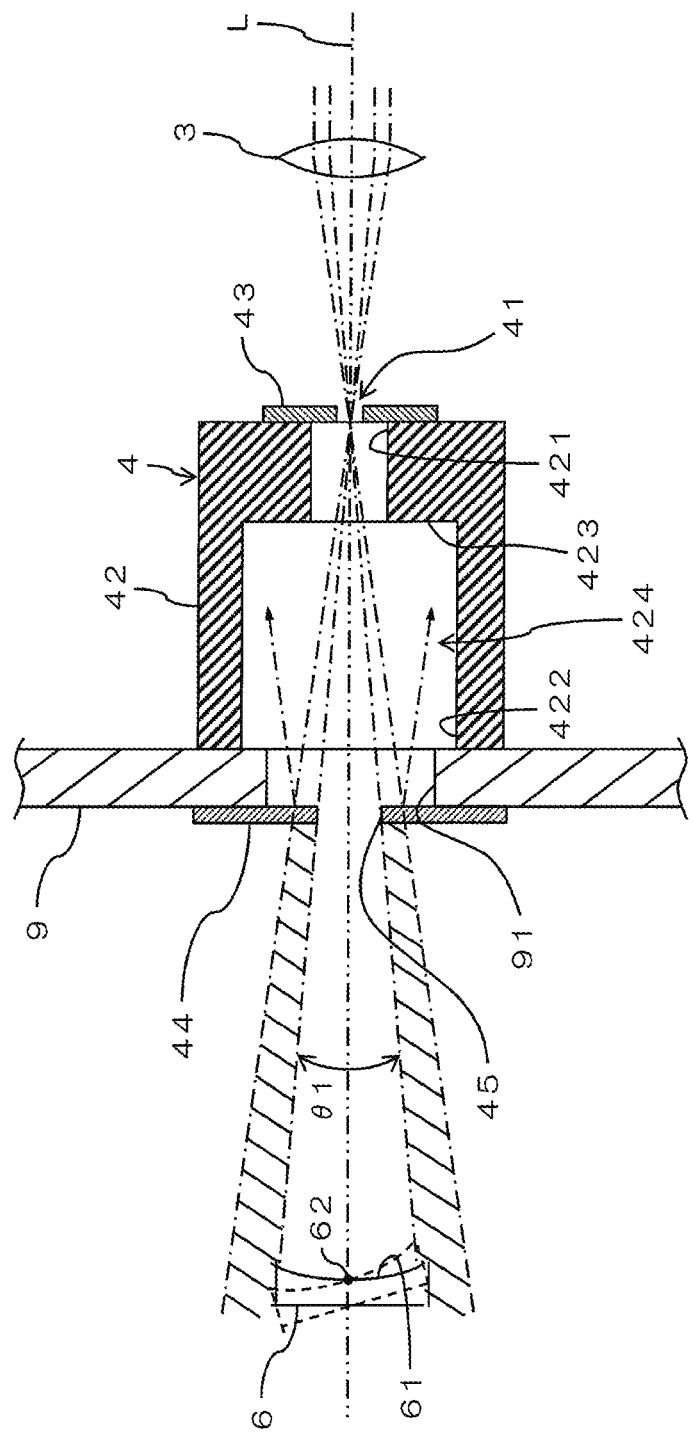
FIG. 3 is a schematic cross-sectional view showing a first modified example of the incident light limiting member.

FIG. 3 is a schematic cross-sectional view showing a first modified example of the incident light limiting member 4. In FIG. 3, as is the case with FIG. 2, the first reflection mirror 5 is omitted for simpler description. This example is different from the case of FIG. 2 only in that the mask plate 44 is separated from the main body 42, and the other components are the same as in the case of FIG. 2; therefore, the similar components are given with the same reference numerals and are not described in detail.

In this example, the main body 42 is attached to the housing 9 from outside, and the mask plate 44 is attached to the housing 9 from inside. That is, the exit-side opening 422 of the main body 42 and the emission slit 45 of the mask plate 44 are communicated with each other via the opening 91 of the housing 9. The mask plate 44 hangs over to a position facing a part of the opening 91 of the housing 9 so as to cover a part of the opening 91, and only light having passed through the emission slit 45 enters the housing 9.

However, the mask plate 44 does not have to be separated from the main body 42, but the incidence plate 43 may be separated from the main body 42, or the incidence plate 43 and the mask plate 44 both may be separated from the main body 42. On the other hand, one member may integrally constitute at least two of the main body 42, the incidence plate 43, and the mask plate 44.

Figure 4:
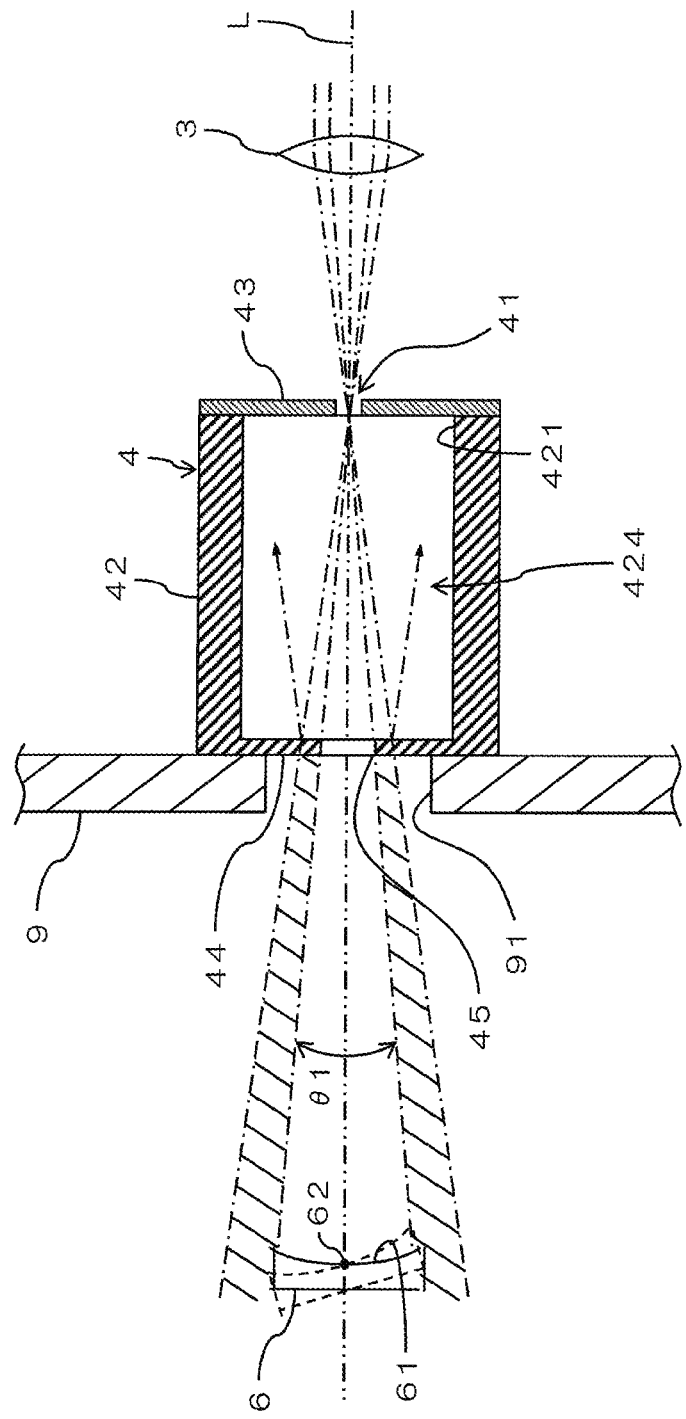
FIG. 4 is a schematic cross-sectional view showing a second modified example of the incident light limiting member.

FIG. 4 is a schematic cross-sectional view showing a second modified example of the incident light limiting member 4. In FIG. 4, as is the case with FIG. 2, the first reflection mirror 5 is omitted for simpler description. This example is different from the case of FIG. 2 in that the main body 42 and the mask plate 44 are integrally formed and that the shape of the trap space 424 is different from the case of FIG. 2, and the other components are the same as in the case of FIG. 2; therefore, the similar components are given with the same reference numerals and are not described in detail.

In this example, the main body 42 and the mask plate 44 are integrally formed by one member. In such a configuration, it is difficult to form the step surface 423 in the main body 42 as in the case of FIG. 2. Therefore, in this example, the step surface 423 is not formed in the main body 42, and the trap space 424 is formed from the mask plate 44 to the entrance-side opening 421.

In this case, the light reflected by the mask plate 44 is attenuated by being repeatedly reflected by the inner surface of the main body 42, the incidence plate 43, and other components. Reflective surfaces such as the inner surface of the trap space 424, that is, the inner surface of the main body 42 and the surface, on the side of the trap space 424, of the incidence plate 43 are painted black, for example, so that light can be attenuated. However, the configuration for attenuating light is not limited to the configuration in which the reflective surface is painted black, and other configurations may be employed, for example, a configuration in which the reflective surface is painted in other colors and a configuration in which a low-reflectance member is attached on the reflective surface.

In the case where the main body 42 and the mask plate 44 are integrally formed as described above, the positional relationship between the main body 42 and the mask plate 44 does not deviate, so that the stray light source can be precisely blocked. In addition, if the incidence plate 43 is also integrally formed with the main body 42, the positional relationship between the main body 42 and the incidence plate 43 does not deviate, so that it is possible to more precisely block the stray light source and to reduce work and time to adjust positions.

Figure 5:
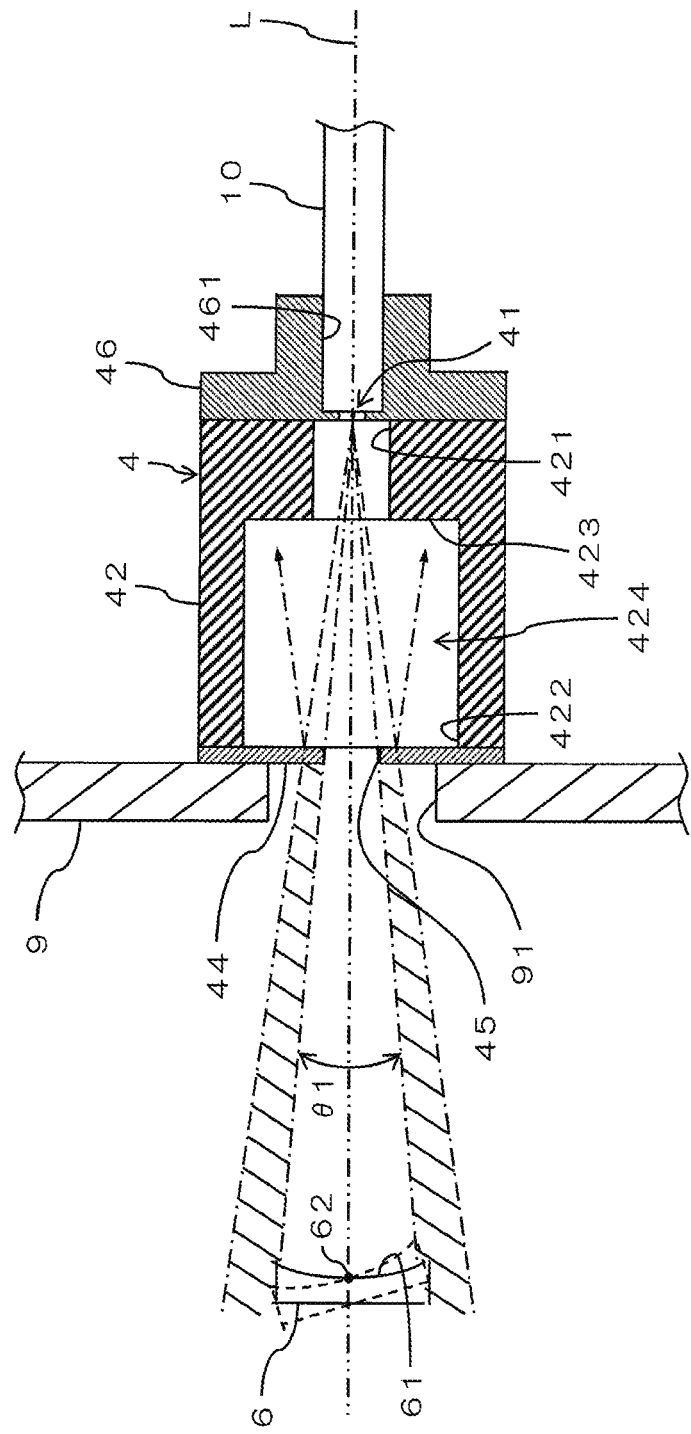
FIG. 5 is a schematic cross-sectional view showing a configuration example of a spectrometer according to another embodiment.

FIG. 5 is a schematic cross-sectional view showing a configuration example of a spectrometer 1 according to another embodiment. In the present embodiment, the optical system for guiding the light from the light source 2 to the spectrometer 1 is constituted by an optical fiber 10 instead of the condensing lens 3. Except for this point, the other components are the same as the components in the above embodiment, and the similar components are therefore given with the same reference numerals in the figure and are not described in detail.

The incident light limiting member 4 is provided with a fiber mount part 46 to which a tip part of the optical fiber 10 is mounted. The fiber mount part 46 is attached to one end face of the main body 42 to cover a part of the entrance-side opening 421. A recessed part 461 extending along the axial line L of the main body 42 is formed in the fiber mount part 46, and the tip end part of the optical fiber 10 is inserted and fixed in the recessed part 461.

The tip end face of the optical fiber 10 is in contact with the bottom face of the recessed part 461. An opening is formed in the bottom face of the recessed part 461, and the opening constitutes the incidence slit 41. As a result, light from the tip end face of the optical fiber 10 passes through the incidence slit 41 and enters the main body 42 via the entrance-side opening 421. However, the incidence slit 41 does not have to be formed in the fiber mount part 46, and may be formed on a member (an incidence plate or the like) provided separately from the fiber mount part 46.

As described above, the optical system for guiding the light from the light source 2 to the spectrometer 1 is not limited to the condenser lens 3, and it can be constituted using other various members such as the optical fiber 10. Instead of using one optical fiber 10, a plurality of optical fibers may be provided.

Figure 6:
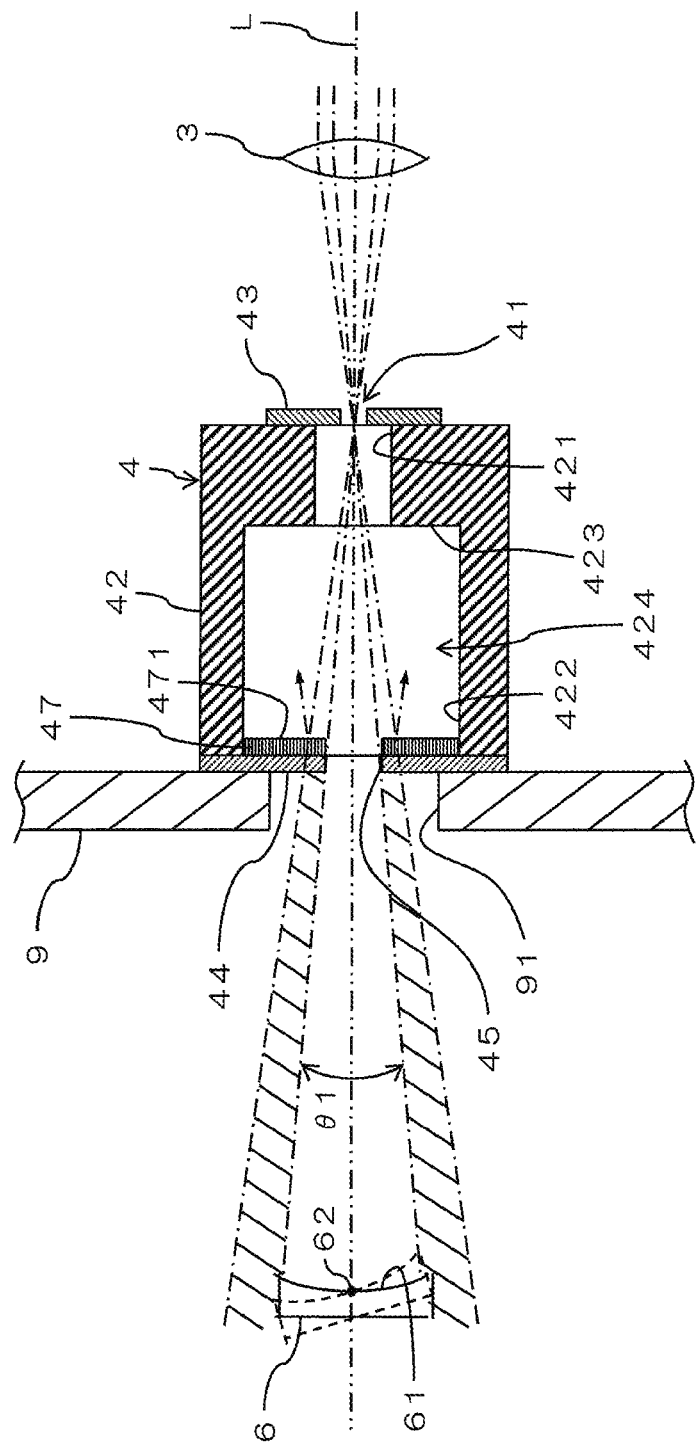
FIG. 6 is a schematic cross-sectional view showing a configuration example of a spectrometer according to still another embodiment.

FIG. 6 is a schematic cross-sectional view showing a configuration example of a spectrometer 1 according to still another embodiment. In the present embodiment, a low-reflectance member 47 is provided on the incident light limiting member 4 shown in FIG. 2. Except for this point, the other components are the same as in the case of FIG. 2, and the similar components are therefore given with the same reference numerals in the figure and are not described in detail.

The low-reflectance member 47 is provided on the mask plate 44. Specifically, the low-reflectance member 47 is provided on the surface, on the side of the trap space 424 (on the side of the incidence slit 41) of the mask plate 44. As shown in FIG. 6, it is preferable that the low-reflectance member 47 cover the mask plate 44 up to the periphery of the emission slit 45.

The surface, on the side of the trap space 424 (on the side of the incidence slit 41), of the low-reflectance member 47 is a low-reflectance surface 471 that reflects light with low reflectance. As the low-reflectance surface 471, various components can be employed, for example, a component painted with a low reflective color such as black, and a component to which a member made of a low reflective material such as raised paper is attached. The reflectance of the low-reflectance surface 471 is preferably 2% or less, but in practice it is more preferably 0.1% to 0.2%.

In the present embodiment, when at least a part of the light not entering the effective area 61 of the diffraction grating 6 is reflected by the mask plate 44 provided between the incidence plate 43 and the diffraction grating 6, the part of the light is reflected while being attenuated by the low-reflectance member 47 provided on the mask plate 44, and in addition, the reflected light is attenuated in the trap space 424. Therefore, stray light can be more effectively reduced.

In the example of FIG. 6, the mask plate 44 is attached to the main body 42. However, the present invention is not limited to this configuration, and a low-reflectance member 47 may be provided on the mask plate 44 in the incident light limiting member 4 in other configurations as shown in FIGS. 3 to 5.

Figure 7:
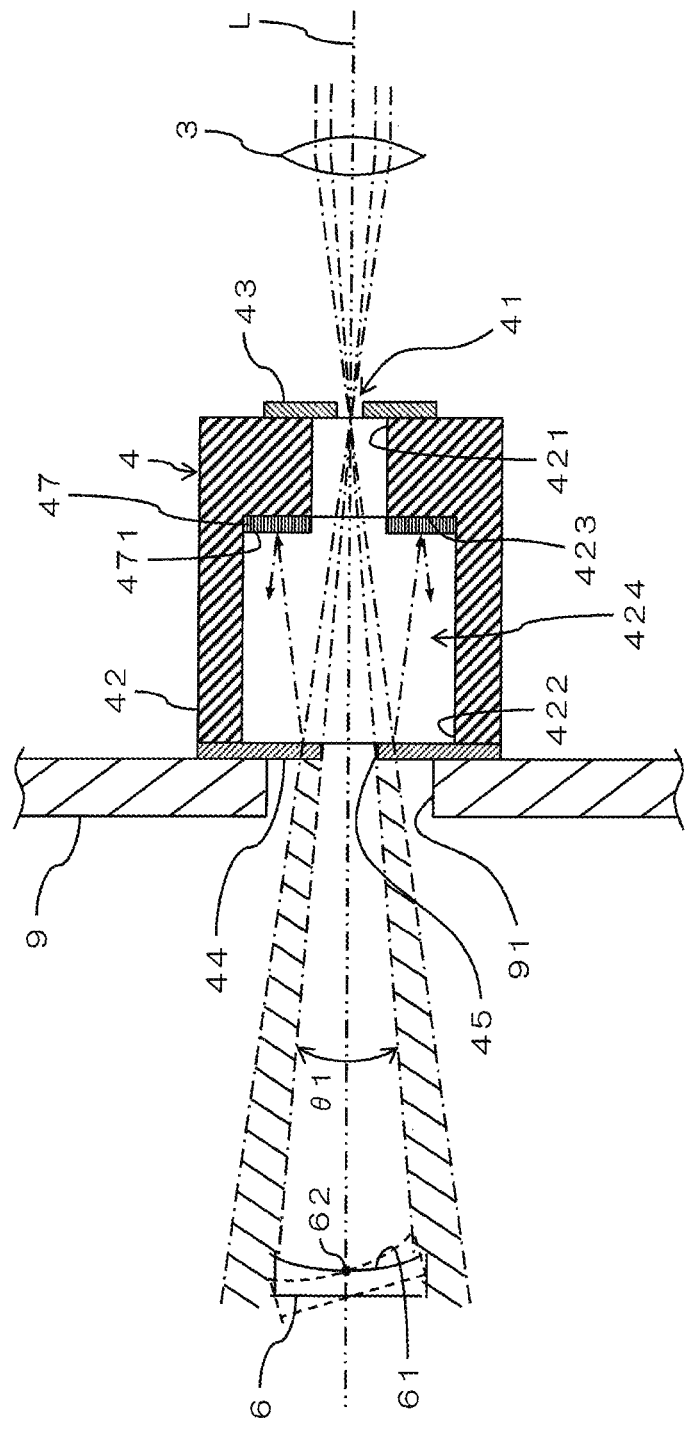
FIG. 7 is a schematic cross-sectional view showing a modified example of the incident light limiting member in the spectrometer of FIG. 6.
Figure 8A:
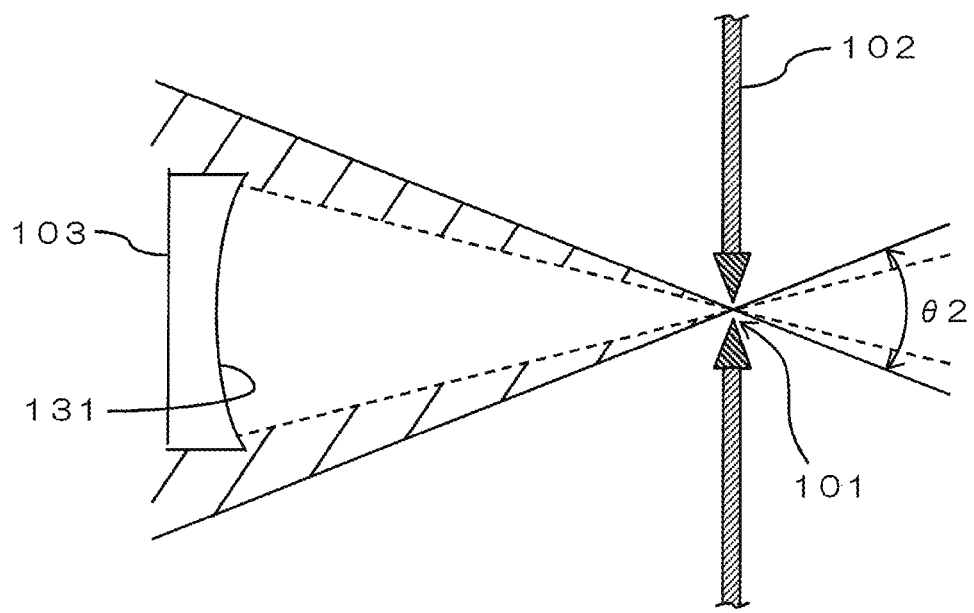
FIG. 8A is a schematic cross-sectional view for illustrating an angular range of an incident light flux and shows a case where an angular range of the incident light flux is large.
Figure 8B:
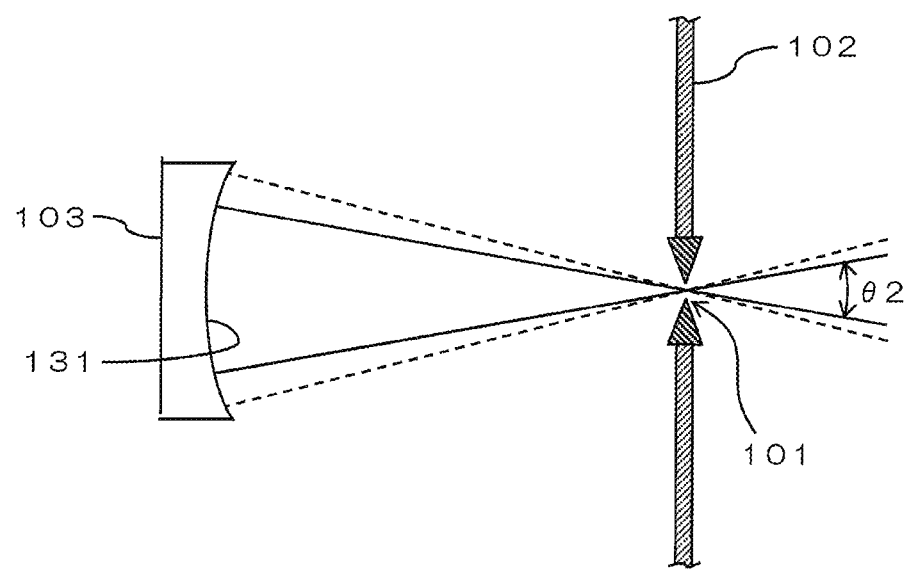
FIG. 8B is a schematic cross-sectional view for illustrating an angular range of an incident light flux and shows a case where the angular range of the incident light flux is small.

FIG. 7 is a schematic cross-sectional view showing a modified example of the incident light limiting member 4 in the spectrometer of FIG. 6. This example is different from the case of FIG. 6 only in that the low-reflectance member 47 is provided on the inner surface of the trap space 424, and the other components are the same as in the case of FIG. 6; therefore, the similar components are given with the same reference numerals and are not described in detail.

The low-reflectance member 47 is provided, for example, on the step surface 423 in the main body 42. With this arrangement, the low-reflectance member 47 is provided at a position at which the light once reflected by the mask plate 44 is reflected by the inner surface of the trap space 424. As shown in FIG. 7, the low-reflectance member 47 preferably covers the inner surface of the main body 42 up to the peripheral edge part of the entrance-side opening 421. However, the low-reflectance member 47 does not have to be provided on the step surface 423, and may be provided at another position on the inner surface of the trap space 424.

The surface, on the side of the trap space 424 (on the side of the emission slit 45), of the low-reflectance member 47, is a low-reflectance surface 471 that reflects light with low reflectance. As the configuration of the low-reflectance surface 471, the same configuration as in the case of FIG. 6 can be adopted.

In this example, at least a part of the light not entering the effective area 61 of the diffraction grating 6 is reflected by the mask plate 44 provided between the incidence plate 43 and the diffraction grating 6, and then is reflected while being attenuated by the low-reflectance member 47 provided on the inner surface of the trap space 424 (the step surface 423). Therefore, stray light can be more effectively reduced.

In the above embodiment, a description is given on the case where the incidence part having the incidence slit 41 is a plate-shaped member such as the incidence plate 43 or is a member, such as the fiber mount part 46, for attaching the optical fiber 10. However, the incidence part does not have to have such a configuration, and any other members can be used to constitute the incidence part. Similarly, the mask part does not have to be constituted by a plate-shaped member such as the mask plate 44, and may be constituted by any other members.

Further, in the above embodiment, a description is given on the case where the trap part having the trap space 424 is constituted by the main body 42. However, the present embodiment does not have to have such a configuration, and the trap part may be provided separately from the main body 42.

Further, in the above embodiment, a description is given to the case where the effective area 61 of the diffraction grating 6 is constituted by a grating surface constituted by a concave surface. However, the effective area 61 of the diffraction grating 6 does not have to have such a configuration, and may be constituted by a grating surface having another shape such as a plain surface. Further, the diffraction grating 11 is not limited to a reflection type diffraction grating that disperses light when the light is reflected in the effective area 61 and may be a transmission type diffraction grating that disperses light when the light is transmitted through the effective area 61.

What is claimed is:

1. A spectrometer comprising:
   an incidence slit through which light from a light source passes is formed;
   a diffraction grating that disperses the light having passed through the incidence slit by refracting, in an effective area of the diffraction grating;
   a mask that is provided between the incidence slit and the diffraction grating and blocks, by reflection, at least a part of the light having passed through the incidence slit but not entering the effective area; and
   a body including a trap space that attenuates the light reflected by the mask part, the body being provided between the incidence slit and the mask.

2. The spectrometer according to claim 1, wherein
   the diffraction grating is rotatably held around a rotation axis,
   the mask blocks, by reflection, light not entering the effective area in a state in which the diffraction grating is rotated at a rotational position at which an amount of light entering at least the effective area is largest.

3. The spectrometer according to claim 1, wherein the mask is detachably attached to the body.

4. The spectrometer according to claim 1, wherein the mask and the trap are integrally formed.

5. The spectrometer according to claim 1, wherein a low-reflectance member that reflects light while attenuating the light is provided on the mask.

6. The spectrometer according to claim 1, wherein a low-reflectance member that reflects light while attenuating the light is provided on an inner surface of the trap space.

7. An incident light limiting member that limits light from a light source entering a spectrometer having a diffraction grating, the incident light limiting member comprising:
   an incidence slit through which light from the light source passes is formed;
   a mask that is provided between the incidence slit and the diffraction grating and blocks, by reflection, a part of light having passed through the incidence slit but not entering the effective area; and
   a body including a trap space that attenuates the light reflected by the mask, the body being provided between the incidence slit and the mask.

\* \* \* \* \*